United States Patent

[11] 3,584,230

[72] Inventor Ping K. Tien
 Chatham Township, Morris County, N.J.
[21] Appl. No. 793,696
[22] Filed Jan. 24, 1969
[45] Patented June 8, 1971
[73] Assignee Bell Telephone Laboratories, Incorporated
 Murray Hill, N.J.

[54] LIGHT WAVE COUPLING INTO THIN FILMS
 17 Claims, 9 Drawing Figs.
[52] U.S. Cl.................................................... 307/88.3,
 250/199, 307/312, 321/69, 330/4.3, 330/4.5,
 330/53, 330/56, 331/94.5, 331/107, 332/7.51,
 333/6, 333/9, 333/10, 333/21, 333/73, 333/83,
 333/95, 333/98, 350/96, 350/168
[51] Int. Cl...................................................... H03f 7/00
[50] Field of Search............................ 307/88.3;
 250/199; 330/4.3, 4.5; 331/107; 332/7.51; 333/95;
 350/96

[56] References Cited
 UNITED STATES PATENTS
 3,420,596 1/1969 Osterberg.................... 350/96

Primary Examiner—Roy Lake
Assistant Examiner—Darwin R. Hostetter
Attorneys—R. J. Guenther and Arthur J. Torsiglieri ABSTRACT: Coupling of light waves through a major surface of a thin film for propagation therein is achieved by means of a distributed action of the evanescent field of a light wave in an internal-reflection prism disposed so close to the film that internal reflection is partially frustrated. Phase-matching of the evanescent wave and the wave propagating in the thin film is obtained by directing the input light beam at the proper angle within the prism toward the internal reflection surface and by providing appropriate indices of refraction of the components.
 Light-utilizing integrated circuits, including dielectric waveguides, modulators, parametric devices and amplifiers are provided with input and output coupling in this fashion. Systems employing directional coupling and channel dropping and adding are also disclosed.

FIG. 1
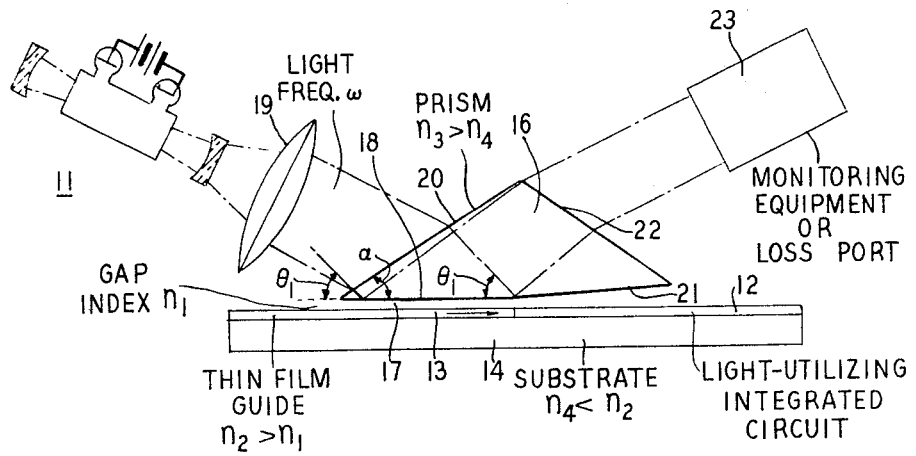
FIG. 2
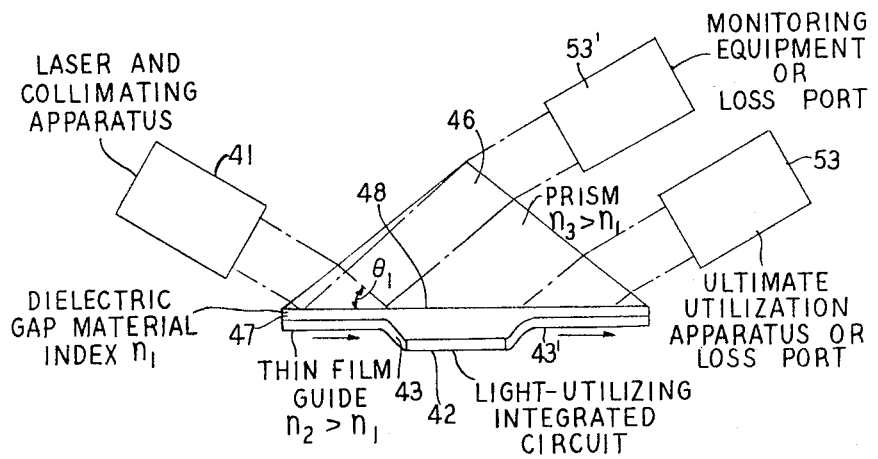
FIG. 3
$|\beta_3|\cos\theta_1 = |\beta_2|$
$|\beta_3| = \dfrac{n_3\omega}{c}$
INVENTOR
P. K. TIEN
BY Wilford L. Wisner
ATTORNEY

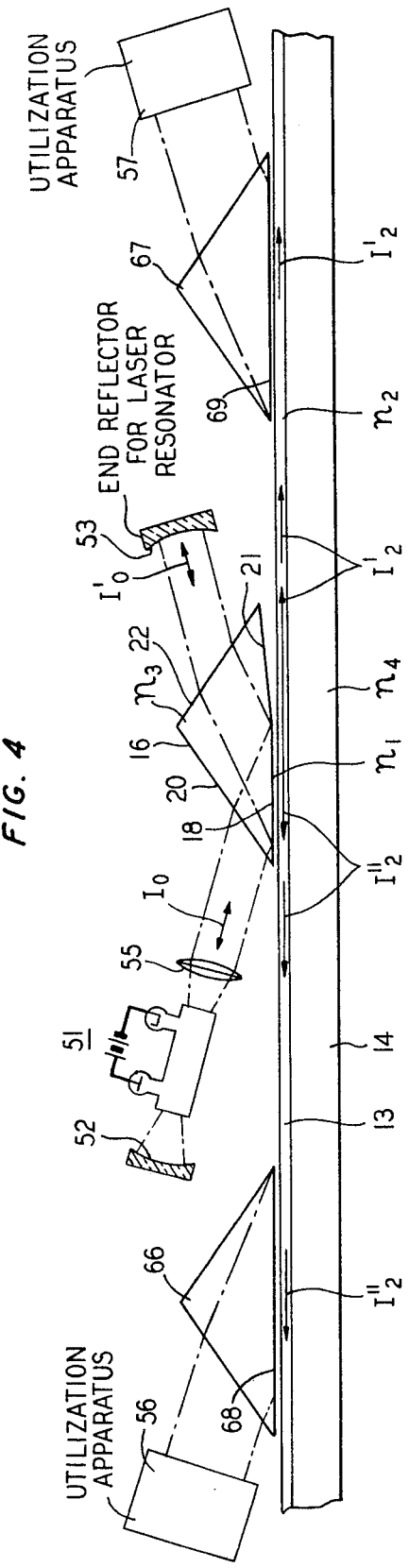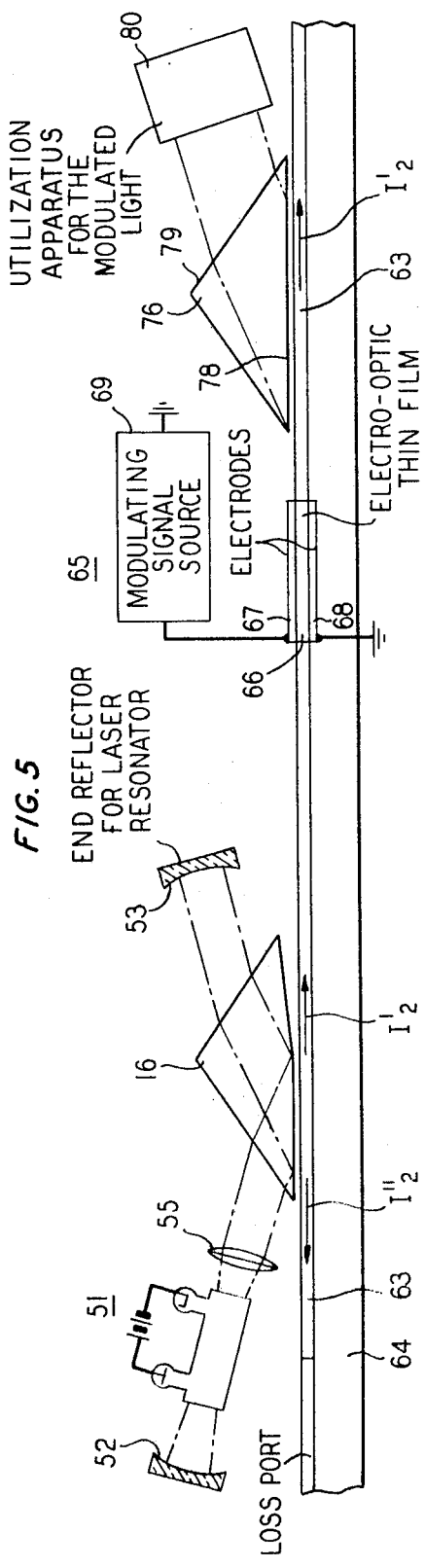

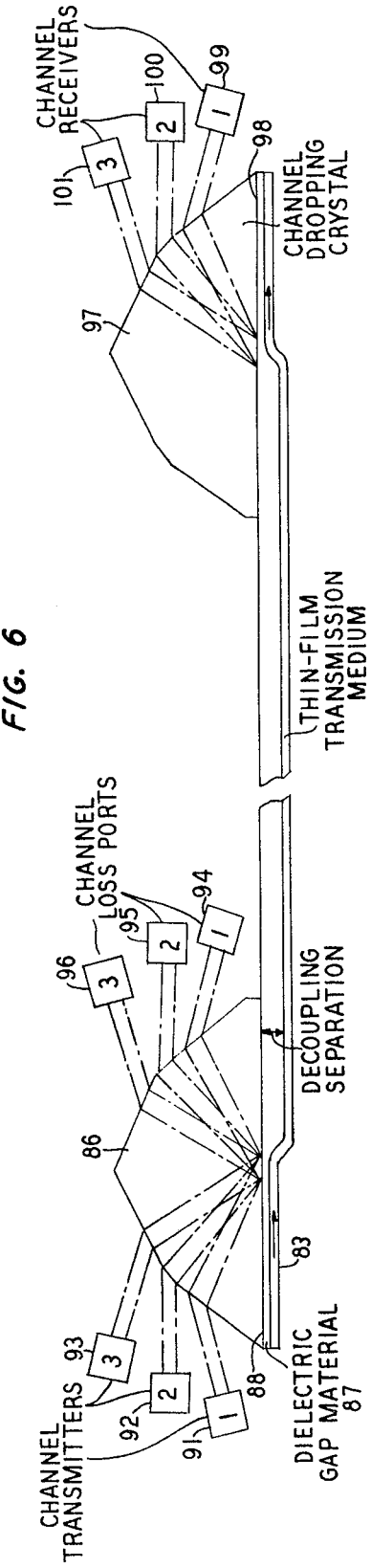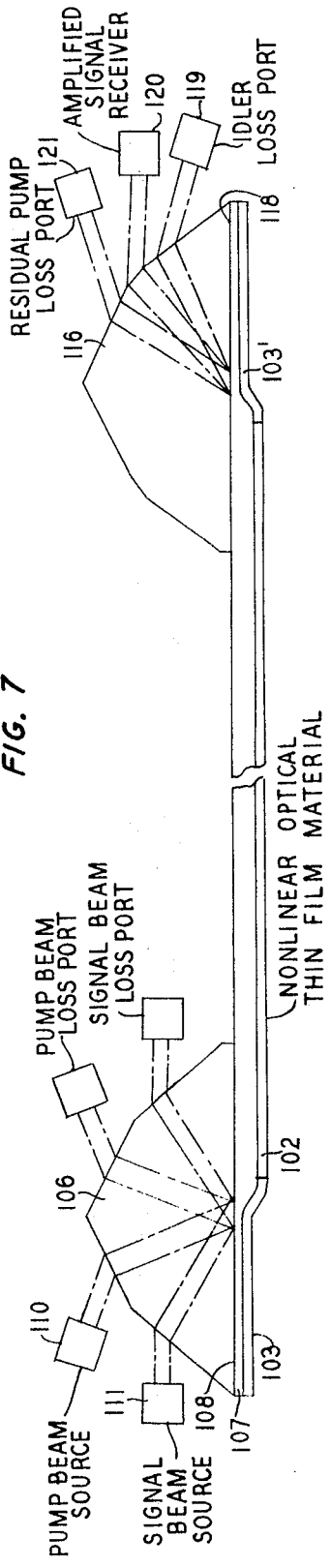

LIGHT WAVE COUPLING INTO THIN FILMS

BACKGROUND OF THE INVENTION

This invention relates to the apparatuses and methods for coupling light waves into and out of thin films.

It has previously been recognized that it is highly desirable to be able easily to couple light waves into and out of thin films, since nearly all communication, information transfer and data processing functions could then be performed with great facility in such thin films. For example, efficient transmission of modulated light waves with negligible mode conversion could be accomplished in such thin films, since the thin film thickness is comparable to the light wavelength. One form of such a light waveguide is disclosed in the copending patent application of E. A. J. Marcatili, Ser. No. 730,192, filed May 17, 1968, and assigned to the assignee hereof.

In addition, parametric amplification and frequency-shifting or laser amplification could be readily provided and would be highly useful in proposed optical communication systems. Also, data processing systems employing logic or storage or both could readily employ optical techniques to a greater extent than at present if propagation in thin films could be easily utilized.

Nevertheless, coupling light waves into and out of thin films has been objectionably difficult because of the typical necessity of coupling the light wave through the edge of the film, particularly if extended propagation of the light wave in the film is desired. It is difficult to feed light waves through the edge of the film. First, the edge of the film is difficult to control in the evaporation or sputtering process. Even in single crystal PN junctions, excessive scattering caused by the end of the junctions has handicapped experiments. Second, the thin films useful for guiding are of the order of 1 micron or less in thickness. It is usually not practical to focus the input light beam to have lateral dimensions of this magnitude in order to direct the input beam through the edge of the film.

Accordingly, it is desirable to have a technique for coupling a light beam into a thin film without transmitting it through the edge of the film.

SUMMARY OF THE INVENTION

I have discovered that a light wave may be advantageously coupled into a thin film through a major surface of the film. The surface of the film can easily be formed with a desired smoothness or even polished. According to my invention, a light wave is coupled into a thin film by means of a distributed action of the evanescent field of a light wave propagating in an internal-reflection prism disposed so close to the film that internal reflection is partially frustrated. The angle of incidence of the light wave upon the internal-reflection surface of the prism is selected and the indices of refraction of the prism, the intervening gap and the thin film are chosen to provide phase-matching between the evanescent field and the light wave which it is desired to propagate in the thin film. It has been found that substantially more than 50 percent of the input light wave may be coupled into the thin film by this technique.

It is one aspect of this invention that the phase-matching provides directional coupling properties which have many uses, for example, in channel dropping and adding. It also provides an additional useful property of frequency selectivity since phase-matching at a particular frequency depends on the use of a corresponding angle of incidence on the prism internal-reflection surface. This property is also useful in channel dropping and adding.

According to one specific feature of the invention, the thin film is decoupled from the internal-reflection prism at a point at which the distributed action of the evanescent field of the light wave in the prism has ceased. Illustrative techniques for achieving the decoupling include removal of a portion of the planar internal-reflection surface of the prism or the introduction of appropriate bends in the thin film to increase the spacing between the decoupled portion of the film and the prism. In the latter arrangement, the prism may be used for structural support of the thin film and the intervening dielectric gap material throughout the extent of the thin film.

Further features and advantages of the invention reside in its application in light-utilizing thin-film integrated circuits, in light-wave modulation, optical parametric devices and in information and data processing circuits.

BRIEF DESCRIPTION OF THE DRAWING

A more complete understanding of the invention will be obtained from the following detailed description, taken together with the drawing:

FIG. 1 is a partially pictorial and partially block diagrammatic illustration of a basic embodiment of the invention;

FIG. 2 is a partially pictorial and partially block diagrammatic illustration of another basic embodiment of the invention providing modified decoupling;

FIG. 3 shows a vector diagram which will be useful in explaining the phase-matching principles of my invention;

FIG. 4 is a partially pictorial and partially block diagrammatic illustration of an embodiment of the invention in which its inherent directional coupling properties are used to advantage;

FIG. 5 is a partially pictorial and partially block diagrammatic illustration of a light-modulating embodiment of the invention;

FIG. 6 is a partially pictorial and partially block diagrammatic illustration of a communication system in which the invention is employed for channel dropping and adding;

FIG. 7 is a partially pictorial and partially block diagrammatic illustration of one form of a parametric amplifier employing the invention;

DESCRIPTION OF ILLUSTRATIVE EMBODIMENTS

Figure 8:
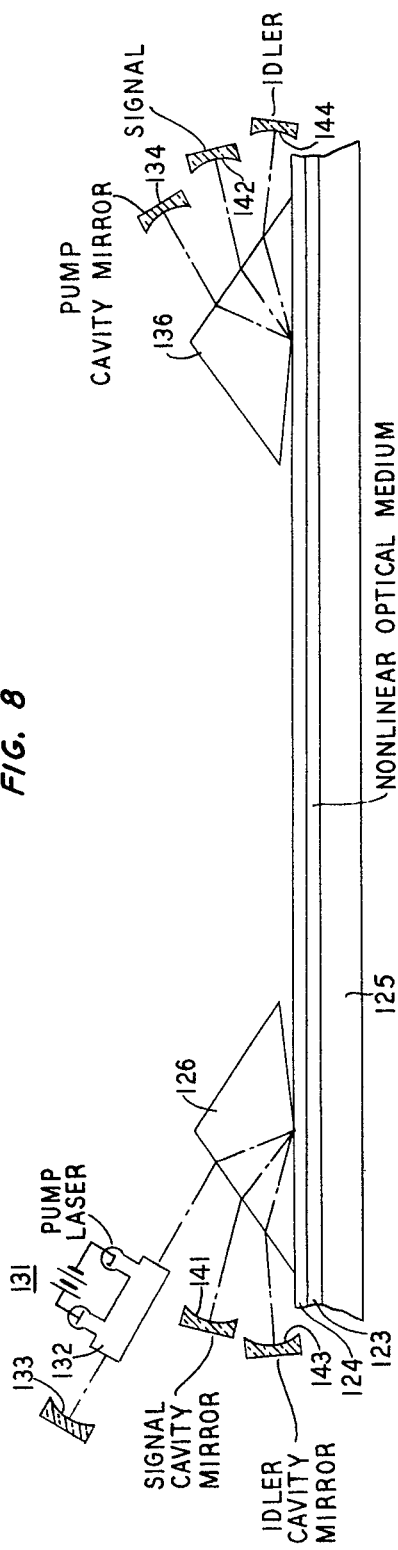
FIG. 8 is a partially pictorial and partially schematic illustration of one form of a parametric oscillator according to the invention.

In the illustrative embodiment of FIG. 1 coherent light from a laser 11 is to be propagated into a light-utilizing thin-film integrated circuit 12, which illustratively has a thickness comparable to the wavelength of the light from laser 11. As mentioned above, the light-utilizing thin-film integrated circuit 12 may involve any of the processing functions typical in communication or data processing systems such as modulation, frequency-shifting, amplification, filtering, detection, switching and logic.

The thin-film integrated circuit 12 is a continuation of the thin-film light guide 13; and both films 12 and 13 are disposed on a substrate 14, which has an index of refraction less than that of the thin films 12 and 13. An internal-reflection prism 16 is disposed near to the film 13 and is separated therefrom by a gap 17, which is small enough so that the evanescent field of a light wave incident upon the internal-reflection surface 18 of prism 16 extends across the gap 17 into the thin-film guide 13. For this purpose, the width of the gap is preferably less than a half-wavelength of the laser light, where the wavelength is the wavelength in the material of the gap. In FIG. 1 the gap index $n_1$, is assumed to be one, that of vacuum. The prism 16 is preferably selected to have an index of refraction $n_3 > n_2$, the index of refraction of thin film 13, and should always be larger than the largest one of $n_1$ and $n_4$, where $n_4$ is the refractive index of the substrate 14.

The coherent light from laser 11 is collimated into a broad beam by lens 19; and that beam is refracted at the surface 20 of prism 16 according to Snell's law. The refracted beam is incident upon surface 18 at an angle $\theta_1$. The angle $\theta_1$ is selected to satisfy the phase-matching condition explained in more detail hereafter; and it is clear that the selection of the angle $\theta_1$ determines the orientation of the common optical axis of laser 11 and lens 19. The region of distributed action of the evanescent field of the light wave extends throughout the area of surface 18, which is illuminated by the beam. As the wave induced in the thin-film guide 13 propagates to the right beyond the region of interaction, its own evanescent field would tend to feed energy back into prism 16, if prism 16 were not decoupled from the film. Therefore, the prism 16 is cut so that its surface 21 beyond the region of illumination by the light beam is canted away from thin-film integrated circuit 12, which is a continuation of the thin-film guide 13. This slight cant or tilt of the surface 21 effectively decouples the prism 16 from the thin film throughout the nonilluminated region of the prism 16. Therefore, the light wave induced in the thin-film guide 13 undergoes multiple reflections inside the thin film as it propagates to the right, first in the interaction region encompassing guide 13, and thereafter in thin-film circuit 12 as it propagates farther to the right. The multiple internal reflections within the film determine the propagation velocity of the wave in the thin film in known manner according to principles analogous to those applicable to a microwave waveguide.

While more than 50 percent of the light from laser 11 can be coupled into the thin films 13 and 12, the remaining portion suffers internal reflection at surface 18 of prism 16 and propagates through the surface 22 of prism 16. Since this radiation is otherwise lost energy, it can be received and measured by equipment 23 appropriate for monitoring the coupling process; or it can simply be absorbed or directed out of the environment of the device. The apparatus may be said to have a loss port at the point of the exit of the residual light beam through surface 22.

The operation of the embodiment of FIG. 1 may be more fully understood from a consideration of the vector diagram shown in FIG. 3. The frustration of internal reflection at surface 18 of prism 16 is a tunneling process of the light waves. To accomplish this, the thin-film guide 13 is positioned less than a wavelength from the surface 18 of prism 16. Second, the angle $\theta_1$ and the various indices of refraction of the prism guide 13 and the intervening gap are related in a way that provides phase-matching. It can be shown that the evanescent field extended from the bottom surface of the prism can be expressed in the form:

$$A_1 e^{-i\omega t + i\beta x p_1 z}. \quad (1)$$

Here $\omega$ is the angular frequency of the laser beam, $$\beta = k n_3 \cos\theta_1 \quad (2)$$

and $$p_1{}^2 = (k n_1)^2 - \beta^2, \quad (3)$$

where $n_3$, $n_2$ and $n_1$ are the refractive indices of the prism, the film and the space between the prism and the film respectively. Here we have taken that $n_3 > n_2 > n_1$. The quantity $k$ is $\omega/c$ and $c$ is the velocity of light in vacuum. We notice that $p$ measures the rate of decay of the evanescent field from the bottom surface of the prism and $\beta$ is the propagation constant of the fields in the $x$ direction. The phase-match condition is then that the phase constant $\beta$ must be equal to that of the propagating mode in the film in order the fields to be coupled.

In FIG. 3 the propagation constant $\beta_3$ of the light wave in the prism and its component in the direction of the light wave in the film are shown. That is, the vector 31 is oriented in the direction of the light wave incident upon internal-reflection surface 18 of prism 16 and has a magnitude $n_3\omega/c$, where $c$ is the velocity of light. Its component in the horizontal direction, or alternatively the propagation constant $\beta_2$ of the light wave propagating in the thin-film guide 13, is represented by the vector 32, which is oriented in the horizontal direction pointing to the right and has a magnitude of $|\beta_3|\cos\theta_1$. Since it also represents the propagation constant $\beta_2$, its magnitude is dependent upon the mode propagating in the film. It is computed from the thickness of the film and the refractive indices of the various media. Usually, there are many modes for a given film. Each has a different value of $\beta_2$. Generally, $\beta_2$ will be in the range between $n_4\omega/c$ and $n_2\omega/c$, if $n_4$ is larger than $n_1$, as is usually the case. If $n_4 < n_1$, then the range of $\beta_2$ is from $n_1\omega/A_c$ to $n_2\omega/c$. From this diagram it is now apparent why the index of refraction of the prism 16 must be greater than the minimum values specified above. Equating formulas for evaluating the horizontal components of the propagation constants and considering the above relationships, we obtain:

$$n_3\omega \cos\theta_1 > n_4\omega, \quad (4)$$

for $n_4 > n_1$. Since $\cos\theta_1$ must always be less than 1, $n_3$ must be correspondingly greater than $n_4$ in order to maintain the inequality which expresses the phase-matching condition.

We see immediately that my invention provides a means to excite different propagating modes in the thin film by choosing different angles $\theta_1$ for the incident beam.

As an example, let prism 16 be a rutile prism (Titanium dioxide, $TiO_2$) and let thin films 12 and 13 be zinc sulfide (ZnS) films on a glass substrate 14. Illustratively, laser 11 is a conventional helium-neon laser operating at 6328 A., $n_3$ (for the extraordinary ray) is 2.901, $n_2$ is 2.35, $n_1$ is 1.00 and $n_4$ (the index of the substrate 14) is 1.50. The width of the gap is illustratively 1330 A. For this illustrative example, I employ a thickness of thin films 12 and 13 which is 1522 A.; and propagation constant $\beta_2$ of the fundamental transverse magnetic (TM) mode in such a film is 0.75 $\omega n_2/c$. In order to excite this mode, the required angle $\theta_1$ for the beam incident on surface 18 is 52°30' for the incident beam to enter and leave the prism surfaces 20 and 22, respectively, with a Brewster angle 70°98' from the surface normal; and the prism angle $\alpha$ should be 18°30'.

With respect to the theoretical aspects of the invention, it should be noted that the compete analysis must take account of the fact that the amplitude of the incident beam does not vary along the length of the interaction region. It is interesting to note that our analysis shows that, when the phase-matching condition is satisfied, the fields along the length of the interaction region do not vary according to a cosine or sine function as in the character of the coupled transmission lines with waves traveling in the same direction. Instead, they vary exponentially. Our analysis shows that there is an optimum length of the interaction region for maximum efficiency. It is convenient to define a dimensionless quantity $s$ related to this length such that:

$$s = \frac{r^2}{8 W_2 \cot\theta_2} x \quad (5)$$

where $\theta_2$ is the angle with respect to the horizontal formed by the path which the light beam would follow if it were diffracted directly into the medium of the thin film 13, $r$ depends on the gap width $2d$ between the prism 16 and the film 13 according to the relationship:

$$r^2 = \frac{1}{\cosh^2 2 p_1 d} \sin 2\Phi_2 \sin 2\Phi_1 \quad (6)$$

where $\cosh$ is the hyperbolic cosine, and $W_2$ in (5) is one-half of the film thickness, and:

$$\tan\Phi_2 = \left(\frac{n_2}{n_1}\right)^2 \frac{P_1}{b_2} \quad (7)$$

$$\tan\Phi_3 = \left(\frac{n_3}{n_1}\right)^2 \frac{P_1}{b_1} \quad (8)$$

$$P_1{}^2 = \beta_2{}^2 - \left(\frac{\omega}{c} n_1\right)^2 \quad (9)$$

$$b_2{}^2 = \left(\frac{\omega}{c} n_2\right)^2 - \beta_2{}^2 \quad (10)$$

$$b_3{}^2 = \left(\frac{\omega}{c} n_2\right)^2 - \beta_2{}^2 \quad (11)$$

The quantity $x$ in equation (5) is the horizontal displacement of the point of interest from the left-hand-most point of the interaction region.

Now if we limit the length of the interaction region so that the maximum is $x=L$, or so that the largest $s$ is $s_L$, then the ratio of the total power carried by the film to that carried by the entire incident beam is a fractional efficiency expressible as:

$$\text{Efficiency} = \frac{2}{s_L}(1 - e^{-s_L})^2 \quad (12)$$

My analysis shows that the maximum efficiency is 81 percent, and it occurs at $s_L=1.25$. This corresponds to a length of 0.173 mm. for the interaction region of the apparatus of FIG. 1 and $r^2=H0.01$. It may be noted that 0.173 mm. is equal to 1135 times the thickness of the film; therefore, it is quite clear that the interaction is truly a distributed interaction.

As mentioned previously, the surface 21 of prism 16 is cut so that it is canted away from the light-utilizing thin-film integrated circuit 12 to prevent the lightwave in the film from tunneling back into the prism 16. Another method to retain the power in the film is shown in the modified embodiment of FIG. 2. In FIG. 2 prism 46 is illuminated by a laser and associated collimating apparatus 41 as in the embodiment of FIG. 1. In this case the prism 46 provides structural support for the thin-film guide 43, 43' and the light-utilizing integrated circuit 42 by virtue of the fact that the gap there between is filled with a dielectric material of index of refraction $n_1$, which will naturally be somewhat greater than unity. The thin films 43, 42 and 43', illustratively zinc oxide (ZnO), are then deposited by conventional techniques over the dielectric gap material 47, illustratively thorium oxide fluoride (ThOF$_2$). The most noteworthy characteristic of this embodiment is that the thickness of the gap material 47 is maintained at the desired spacing, for example 1125 A., for $n_1=1.4$, throughout the intended interaction region with the broad light beam from sources 41. Thereafter, it is substantially thickened by a factor of several times to provide a correspondingly greater spacing between a light-utilizing integrated circuit 42 and surface 48 of prism 46. Such a variation in thickness can be achieved by known thin-film deposition techniques, such as evaporation or sputtering with the air of masking of the thinner areas.

Let us assume that the light-utilizing integrated circuit has modulators, frequency-shifters within itself or that it otherwise performs operations upon the light wave propagating therein. After these operations are complete, it is desired to couple out as much of the modified light wave as possible for utilization apparatus 53. Alternatively, if all desired functions are completed within the thin film, some arrangement symbolically designated a loss port must be provided for preventing reflections from thin film 43' back into light-utilizing circuit 42. As in FIG. 1, the efficiency of the coupling process can be measured by monitoring the reflected beam from surface 48, which propagates toward the monitoring equipment 53'. Alternatively, the apparatus 53' can also be symbolically termed a loss port.

The operation of the embodiment of FIG. 2 is, in respect to the input coupling of the light, substantially similar to that of FIG. 1. The output coupling from thin-film light guide 43' toward apparatus 53 can be mathematically described in analogous manner to the input light coupling with the difference that no reflection occurs in the pertinent interaction region; and the energy transfer is from the film to the prism 46. It will be noted that from the surface 48 of prism 46 there propagates a broad beam similar in lateral dimensions to the input light beam, and, assuming no frequency shift of the beam, it propagates at the same angle $\theta_1$ to the horizontal.

It should be emphasized that the reflected light power and other extracted light power is not necessarily lost. For example, an optical resonator can be constructed by placing reflectors normal to the incident and reflected beams as shown in the embodiment of FIG. 4. This embodiment differs from the embodiment of FIG. 1 in that one reflector 53 of the laser 51 is disposed to intercept the light beam reflected from surface 18 of prism 16. The remainder of the laser including the reflector 52, tube 54 and the collimating lends 55 is disposed in appropriate position to provide the desired input beam to prism 16. It should be clear that in this case it is desirable to adjust the efficiency of the coupling so that it is only about as great as the tolerable single-pass loss of the particular laser employed. Thus, laser oscillation can be sustained.

Another interesting feature of the embodiment of FIG. 4 resides in its directional coupling properties. Since the coherent light is propagating in both directions in prism 16, induced waves will be caused to propagate both to the left in thin-film light guide 13 and to the right in guide 13 from the interaction region in the vicinity of internal-reflection surface 18 of prism 16. Both of these waves can be separately processed and can be separately coupled out for utilization in different utilization apparatuses. In each case the wave coupled out will have a component of its propagation vector in the direction of propagation of the light wave in the thin film; and the phase-matching conditions set out before will be satisfied in each case.

In the illustrative embodiment of FIG. 4 the output coupling is provided by prisms 66 and 67, both illustratively similar to but smaller than, prism 16 and spaced at like distances from thin-film guide 13. No internal reflection need be provided for, and, thus, no problem of decoupling arises. Surfaces 68 and 69 may be entirely flat. Although no processing of light waves propagating in light guide 13 is shown in FIG. 4, it should be understood that in modified embodiments employing frequency-shifting that the two output waves could be provided with different frequencies and would propagate at different angles with respect to the coupling surfaces 68 and 69 of prisms 66 and 67, respectively.

The embodiment of FIG. 4 may be particularly useful in cases in which it is desired to split a coherent light beam into two parts of equal intensity or power. Likewise, a fixed ratio of intensity could be provided.

One of the functions that could be provided in thin-film integrated circuits such as 12 and 42 is that of modulation of the coherent light with a signal from a modulating signal source. An example of such a system is shown in FIG. 5. The laser 51 is like that of FIG. 4 and includes the input coupling prism 16. The induced light wave $I_2''$ propagating to the left in the film 63 is illustratively absorbed or utilized in some apparatus not of interest here. The light wave $I_2'$ propagating to the right in film 63 is modulated in a modulator 65 including a portion 66 of film 63, which is provided with specially modified properties for the purpose of modulation, the electrodes 67 and 68 and the modulating signal source 69, which is connected between the electrodes 67 and 68. Illustratively, the thin film 63 is a gallium arsenide thin film deposited on a sapphire substrate 64. The gallium arsenide in the region 66 of thin film 63 is compensated so that its impurity is very low, of the order of $10^7$ per cubic centimeter concentration, to provide a loss-free medium for the microwave modulation signal.

Illustratively, polarization modulation of known type is provided. The crystalline axes of the gallium arsenide are oriented so that its 1,1,1 crystalline axis is normal to the planes of the electrodes 67 and 68 and parallel to the polarizations of the light and microwave fields in the film. The preferred wavelength of the coherent light is illustratively 10.6 microns and is readily provided by a $CO_2$ vibrational-rotational transition laser 51 of type now well known in the laser art. The polarization-modulated 10.6 microns coherent light is coupled out of film 63 by a coupling prism 76, which is illustratively identical to prism 16, except that the length of the coupling surface 78 may be made sufficiently short to avoid the need of a canted surface beyond the interaction region. The broad modulated light beam coupled out through surface 79 of prism 76 is received by a utilization apparatus 80 which may be the detector at a remote receiving station. The latter use is particularly feasible if the separation between the modulator 65 and prism 79 is substantial. In the case of separations of the modulator 65 and prism 79 by many miles, parametric amplification and frequency shifting of the propagating line may be provided. Typically, such amplification and frequency-shifting devices, including the needed coupling prisms and pump-beam sources, could be associated with the thin film by gradual changes in the composition thereof. Such gradual changes will avoid the scattering inherent in the interface between the edges of different types of thin films. An example of suitable parametric amplification will be discussed hereinafter in connection with FIG. 7, with the modification that the signal beam is already propagating in the thin film.

Because of the dispersions of both the prism and the thin film in apparatuses according to my invention, a propagating mode in the thin film has a value of $\beta$, its propagation constant, which is dependent on its frequency. Different modes of differing frequency will have different propagation constants and, thus, require different angles of injection, $\theta_1$, at the coupling surface of the coupling prism. Accordingly, we have a basis for multiple channel operation employing my invention.

An example of multiple channel communication is provided in the embodiment of FIG. 6. Signals from different channels having different center frequencies, for example, signals from the different channel transmitters 91, 92 and 93, are fed into the multifaceted coupling prism 86 at different angles so that after refraction they are incident upon the coupling surface 88 at angles which provide phase-matching with the corresponding propagating waves in the thin film 83. Here again, loss ports 94, 95 and 96 receive the reflected portions of the light beams originally emitted from transmitters 91, 92 and 93, respectively, and are shown symbolically. The dielectric gap material 87 and the material of the thin-film guide 83 may be the same as those of their counterparts in FIGS. 1 or 2; and decoupling beyond the interaction region is provided by an increased thickness of the dielectric gap material 87.

A principal difference from the preceding embodiments is provided by the shape of the coupling prism 86. It is provided with a separate face or facet for each of the input and output beams, such that the various angular requirements are most readily satisfied. For example, by appropriate selection of the orientation of each face it is possible to have each beam incident upon that face at Brewster's angle while still satisfying the phase-matching conditions at the coupling surface 88. After coupling into the thin film 83, the various modulated light beams of the respective communication channels propagate through the same waveguide, which is formed by thin film 83.

At some point farther down the guide it is desired to separate one or all of the modulated light beams to provide that each will reach its respective receiver for that communication channel. Illustratively, it is assumed for the sake of simplicity that all of the channels are separated at a common region in the vicinity of the coupling surface 98 of coupling prism 97. Here the thickness of the dielectric gap material 87 is again reduced to a fraction of a wavelength, so that the evanescent fields of the light waves extend into prism 97. Three distinct light beams will thereupon propagate upward to the right of prism 97 in a precise direction determined by the phase-matching conditions. In other words, the phase-matched wave in each case will automatically be the wave that propagates in prism 97. Each of the coupled beams propagating in prism 97 is incident upon a separate face or facet provided therefor and will undergo refraction at that face in a direction toward the respective channel receiver 99, 100 or 101.

It should also be understood that with adequate frequency spacing of the various channels, the modulated light beams carrying the signals of the respective channels can be separated from the thin film guide 83 at different points. It is merely necessary that the frequency separation be great enough that the evanescent field of only one of the light beams extends into the coupling prism strongly enough to induce a substantial propagating wave therein.

Alternatively, for smaller frequency spacings, at each channel dropping point one channel only may be removed from the guide by first separating all of the channels in a prism such as 97 and then reinjecting all but one of them into a similar coupling prism that reinduces them into the guide. Suitable amplification can be provided for the latter channels.

As another alternative, special prisms may be used such that only one of the channel light beams is permitted to escape from the coupling prism; the others are directly coupled back into the film.

My invention is particularly advantageous for nonlinear optical applications such as second harmonic generation and parametric oscillators and amplifiers. In this regard it should be recalled that, not total power, but the power density (or the field intensity), is important in a nonlinear optical application. It can be shown that the power density of the light beam induced in the thin film by my method is $4/r^2$ times larger than that of the incident beam. For example, for $r=0.1$, the power density is 400 times larger than that of the incident beam. Moreover, well defined modes in the thin film increase the coherence lengths of the interaction.

Moreover, it should be noted that phase-matching among signal, idler and pump waves in the thin film are readily obtained in semiconductor thin films; and in addition, the phase-matching conditions are considerably relaxed because of the ease of selection of appropriate propagating modes that can be made available in the thin films.

An example of a parametric amplifier employing the present invention is shown in FIG. 7. A pump-beam source 110 and a signal-beam source 111 direct their outputs upon different facets of a coupling prism 106 similar to prism 86 of FIG. 6. Since the pump and the signal have different values of propagation constant, they may be coupled into and out of the thin-film guide 103 by appropriate angles of incidence upon the coupling surface 108 of prism 106. Prism 106 is then designed to provide incidence of the pump beam at Brewster's angle upon the respective faces of incidence.

Particularly noteworthy in the embodiment of FIG. 7 is the fact that nonlinear optical material can be used throughout the thin-film guide 103 or only in the decoupled section 102 where the dielectric-gap material 107 has required a relatively large thickness. In the latter case, the transition may be abrupt, if some other interface can be provided, or may be accomplished by a gradual change in the composition of the material of thin film 103.

After amplification is complete, the thickness of dielectric-gap material 107 is reduced, and coupling occurs from a section 103' of the thin film through the coupling surface 118 of a coupling prism 116, which is similar to prism 106 except for an additional output facet for the generated idler wave. It is necessary to remove the idler wave at this point in order to prevent spurious reflections of the idler wave and consequent downgrading of the parametric amplification. The amplified signal wave is received by a receiver 120, and any remaining pump wave is removed at the pump loss port 121.

Another advantageous application of my invention is that optional resonators can easily be built for all three of the pump, signal and idler waves in a parametric oscillator, since they enter the input prism, e.g., prism 126 in FIG. 8, and leave the output prism, e.g., prism 136 in FIG. 8, in different directions. These prisms, in the parametric oscillator embodiment of FIG. 8, are similar to the coupling prism of FIG. 1. Although miltiple-phased prisms of the type shown in preceding embodiments are not shown here, since they are not essential, they could also be used in order to provide incidence of each of the waves at Brewster's angle at each entrance or exit surface.

The thin film 123 in the parametric oscillator embodiment of FIG. 8 is entirely of a nonlinear optical medium such as $LiNbO_3$ for a pumping laser operating at $1.06\mu$, and the dielectric-gap material could be $ThOF_2$. The substrate 125 could be glass. The thickness of thin-film 123 is illustratively 4000 A., and the materials of prisms 126 and 136 are illustratively rutile ($TiO_2$). The pump-beam source is provided by the pump laser 131, including the symbolic laser tube 132 and the end reflectors 133 and 134, the latter being disposed to intercept the pump output beam from output coupling prism 136. Similarly, in the signal optical resonator, one reflector 141 is disposed in the vicinity of prism 126; and the other reflector 142 is disposed in the vicinity of prism 136, each to intercept the signal wave which propagates into and out of the respective prisms in a distinct angle with respect to the horizontal with respect to the phase-matching conditions. Similarly, the idler resonator is formed by reflectors 143 and 144.

Because of their compatibility with developing integrated circuit techniques, it appears that PN junction laser amplifiers may be quite significant in future optical communication systems. My invention makes such junction laser amplifiers much more readily usable in optical communication systems, as illustrated by the embodiment of FIG. 9.

Figure 9:
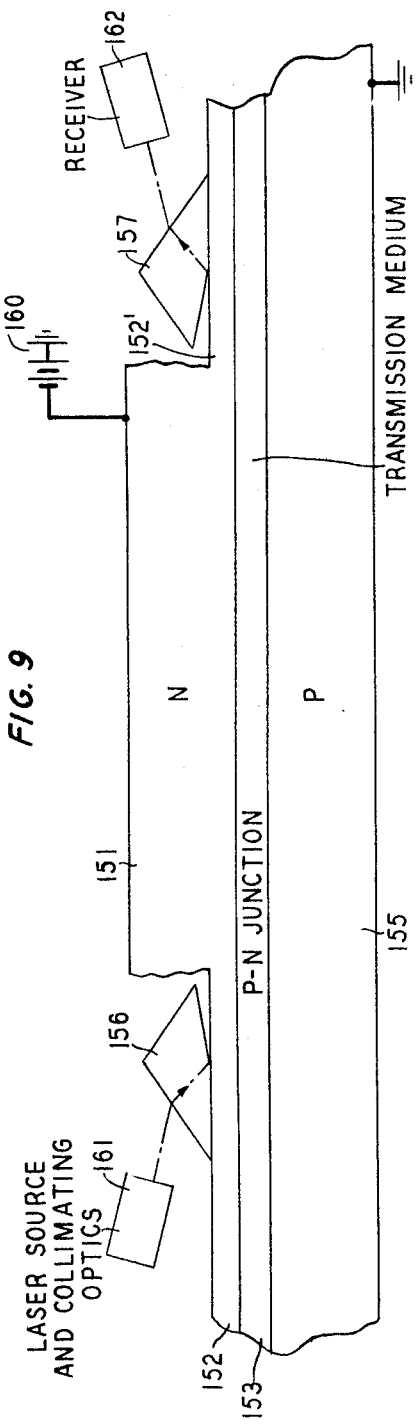
FIG. 9 is a partially pictorial and partially block diagrammatic illustration of a PN junction optical guiding apparatus employing the invention.

In the embodiment of FIG. 9 part of the top N-type layer 151 of a PN junction semiconductor laser is illustratively polished or etched away, and output coupling prisms 156 and 157 are inserted over the remaining thickness 152 and 152′ of N-type material, which serves as the dielectric gap of an arrangement according to my invention. The PN junction itself serves as the thin-film wave guide analogous to the guide 13 of FIG. 1. Structural support is provided by the P-type material 155 on the other side of the PN junction.

The operation of the embodiment of FIG. 9 may be characterized as follows. With a suitable source of bias 160 connected between N-region 151 and P-region 155, a condition is established such that the threshold of oscillation would nearly be obtained in the absence of an input light beam coupled through prism 156. It is well known that if the input signal light wave coupled through a PN junction laser is very large, that oscillation is effectively suppressed because the threshold of oscillation is correspondingly increased. Then the semiconductor junction laser operates as an efficient light amplifier. Therefore, the dimensions of prism 156, gap 152 and the junction 153 are selected with respect to the modulated light beam from the source 161 to provide strong coupling of the modulated light wave, e.g., more than 50 percent into the junction 153. Amplification then occurs in junction 153, and the amplified beam is extracted through coupling prism 157 and received in receiver 162. As an illustrative specific example, the center frequency of the beam from source 161 is assumed to be 8000 A., and the PN junction 153 is the junction of a gallium arsenide laser.

It should also be noted that the invention has useful scientific application. For example, by measuring the direction of the reflected ray from the input coupling prism, one can determine the refractive index of the thin film of the guide. This technique is more accurate than the conventional measuring technique which involves measuring the maximum and minimum intensities of an interference pattern. Thus, future investigations of optical materials and their properties which are pertinent to optical communication devices should proceed much more rapidly with the aid of my invention.

I claim:

1. A light-wave coupling arrangement comprising a body of substantially lossless optical material, said body having two major plane parallel surfaces and an index of refraction $n_2$, a prism of substantially lossless optical material having an index of refraction $n_3$, said prism being adapted for internal reflection of light therein and being disposed with a first surface parallel to said major surfaces of said body and separated therefrom by a gap of index $n_1$, to partially frustrate internal reflection said environment adjacent the major surface remote from the gap having an index $n_4$, $n_3$ being larger than the largest one of $n_4$ and $n_1$, said arrangement being oriented to receive a coherent input light beam at an angle providing phase-matched coupling of said beam to a wave propagating in said body transverse to the direction of said beam.

2. An apparatus according to claim 1 including means for extracting from the body a portion of the light wave propagating therein.

3. An apparatus according to claim 1 including means within the body for utilizing the light wave propagating therein.

4. Apparatus according to claim 1 including a source of the input coherent light beam, said source including an optical resonator having at least one reflector disposed to intercept light that has passed through the prism.

5. Apparatus according to claim 4 including two output coupling prisms disposed to couple out of the body light waves propagating in different directions therein.

6. Apparatus according to claim 1 in which the prism and the body are mutually decoupled beyond the region of frustrated internal reflection in a direction in which light propagates in the body.

7. Apparatus according to claim 6 in which the prism and the body are mutually decoupled in that said prism and said body are mutually shaped to increase the spacing therebetween beyond the region of frustrated internal reflection in a direction in which light propagates in the body.

8. Apparatus according to claim 7 in which the prism is cut to have a second surface forming an obtuse angle with the first surface parallel to the major surfaces of the body, said second surface being disposed beyond said first surface in a direction in which light propagates in the body.

9. Apparatus according to claim 7 in which the body is bent away from the prism beyond the region of frustrated internal reflection in a direction in which light propagates in the body.

10. Apparatus according to claim 1 in which the body is associated with means for modulating light propagating therein.

11. Apparatus according to claim 1 including a substantially lossless optical medium separating said prism and said body and having an index of refraction $n_1$ less than both $n_3$ and $n_2$.

12. Apparatus according to claim 1 in which the prism is adapted to receive differing coherent light beams at differing angles providing phase-matched coupling of all of them to different waves propagating in the body.

13. Apparatus according to claim 12 including a second prism adapted for coupling out of the body at differing angles portions of a plurality of different waves propagating therein.

14. Apparatus according to claim 13 in which both of the prisms have multiple faces through different ones of which the different beams and waves are coupled.

15. Apparatus according to claim 13 including a plurality of communication channel transmitters adapted for directing modulated light beams on respective faces of the first prism, and including a respective plurality of communication channel receivers adapted for receiving modulated light beams from respective faces of the second prism.

16. Apparatus according to claim 13 including a pump beam source and a signal beam source adapted for directing a pump light beam and a modulated signal light beam on respective faces of the first prism, and including a receiver for an amplified signal or idler light beam adapted to receive a modulated signal or idler light beam from one of the faces of the second prism, the body including optically nonlinear material adapted for transferring power from the pump beam into other beams called the amplified signal and idler beams.

17. Apparatus according to claim 1 in which the body is a semiconductive junction region, said apparatus including differing types of semiconductive material forming said junction region.